United States Patent [19]

Schleupen

[11] Patent Number: 4,475,526

[45] Date of Patent: Oct. 9, 1984

[54] APPARATUS FOR GENERATING A SIGNAL TRAIN DEPENDENT ON ROTARY SPEED

[75] Inventor: Richard Schleupen, Ingersheim, Fed. Rep. of Germany

[73] Assignee: Robert Bosch GmbH, Stuttgart, Fed. Rep. of Germany

[21] Appl. No.: 464,507

[22] PCT Filed: Apr. 1, 1982

[86] PCT No.: PCT/DE82/00076

§ 371 Date: Jan. 27, 1983

§ 102(e) Date: Jan. 27, 1983

[87] PCT Pub. No.: WO83/00193

PCT Pub. Date: Jan. 20, 1983

[30] Foreign Application Priority Data

Jul. 10, 1981 [DE] Fed. Rep. of Germany ....... 3127220

[51] Int. Cl.$^3$ ............................. F02P 3/04; F02P 1/00
[52] U.S. Cl. ..................................... 123/618; 123/414
[58] Field of Search .............. 123/618, 414, 617, 612, 123/415, 418; 315/209 T; 324/208; 235/103

[56] References Cited

U.S. PATENT DOCUMENTS

| | | | |
|---|---|---|---|
| 3,943,896 | 3/1976 | Green et al. | 123/618 |
| 4,271,812 | 6/1981 | Bodig et al. | 123/618 |
| 4,308,848 | 1/1982 | Pfaff et al. | 123/618 |
| 4,367,721 | 1/1983 | Boyer | 123/618 |
| 4,398,516 | 8/1983 | Momoyama | 123/414 |

Primary Examiner—Raymond A. Nelli
Attorney, Agent, or Firm—Frishauf, Holtz, Goodman & Woodward

[57] ABSTRACT

An apparatus is proposed for generating a signal train dependent on rotary speed from the periodic voltage of an inductive transducer arrangement, especially for controlling ignition systems in internal combustion engines. The transducer voltage is delivered to a threshold stage. In order to reduce an inherent systematic error, means are provided which shift the transducer voltage, before it is supplied to the threshold stage, in accordance with amplitude in such a manner that the switching point of the threshold stage is invariant for a given rotary angle.

18 Claims, 3 Drawing Figures

APPARATUS FOR GENERATING A SIGNAL TRAIN DEPENDENT ON ROTARY SPEED

The present invention relates generally to inductive transducers used in motor vehicle ignition systems, and more particularly to an improved circuit for deriving a digital output from the signal produced by the transducer.

It is known, especially in ignition systems, to use inductive transducer arrangements, which supply voltages dependent on rotary speed. These voltages are delivered to a threshold stage, which furnishes a signal train dependent on rotary speed. As the rotary speed increases, the amplitude of the voltage emitted by the transducer normally increases as well. At a constant threshold value of the threshold stage, the range of shaft angle at which the threshold value is exceeded varies as a consequence of the increase in amplitude. The result is that the ignition system in which the transducer arrangement is used exhibits an inherent systematic error.

THE INVENTION

The apparatus according to the invention and having means for shifting the transducer voltage signal, in accordance with amplitude, before the voltage signal is applied to the input of the threshold stage has the advantage over the prior art that, as a result of the shift in voltage of the transducer signal, the thus-modified input signal of the threshold stage crosses over or under the threshold value at the same rotary angle despite varying amplitudes of the transducer voltages. An inherent systematic error on the part of the ignition system is thereby avoided or sharply reduced.

DRAWINGS

FIG. 1, a circuitry realization of the exemplary embodiment;

FIG. 2, voltage courses for the apparatus according to the invention, plotted in accordance with time; and FIG. 3, transducer voltages and the output voltage of the threshold stage, plotted in accordance with the rotary angle.

DETAILED DESCRIPTION

Figure 1:
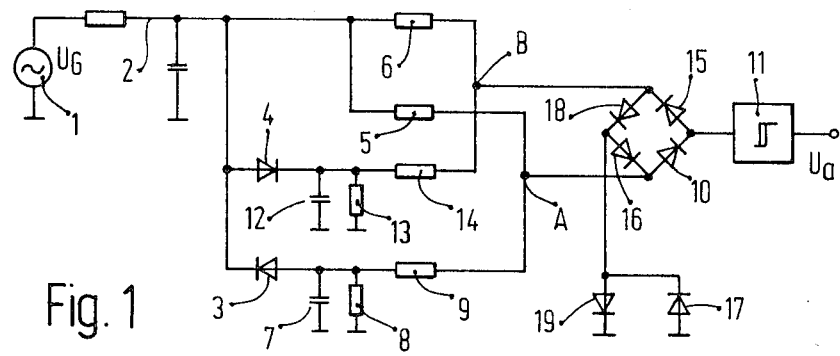

An inductive transducer arrangement 1, which can preferably be connected with the crankshaft or camshaft of an internal combustion engine or with some other shaft of an engine, is connected via a low-pass filter 2 with the cathode of a first diode 3 and the anode of a second diode 4, a first resistor 5 and a second resistor 6. Taken in order from the anode of the first diode 3, a first capacitor 7 is connected to ground, and a first discharge resistor 8 is located parallel to it. A third resistor 9 which is connected with the first resistor 5 is also connected with the anode of the first diode 3. The junction A of these two resistors 5, 9 is connected via a third diode 10 with the input of a threshold stage 11 embodied as a Schmitt trigger; the anode of the third diode is located at the junction A and the cathode is located at the input of the Schmitt trigger 11. Taken in order from the cathode of the second diode 4, a second capacitor 12 is connected to ground, and a second discharge resistor 13 is located parallel to it. The cathode of the second diode 4 is furthermore connected via a fourth resistor 14 with the second resistor 6. The junction B of these two resistors 6, 14 is connected via a fourth diode 15 to the input of the Schmitt trigger 11, and the cathode of the fourth diode 15 is located at the junction and the anode is located at the input of the Schmitt trigger 11. The junctions between the first and third resistors 5, 9 and between the second and fourth resistors 6, 14 are connected to ground via protective diodes 16–19. The resistors 9 and 14 are approximately twice as large as the resistors 5 and 6.

Figure 2:
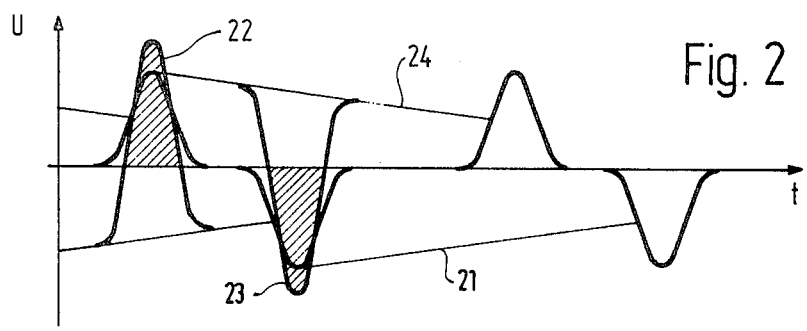
Figure 3:
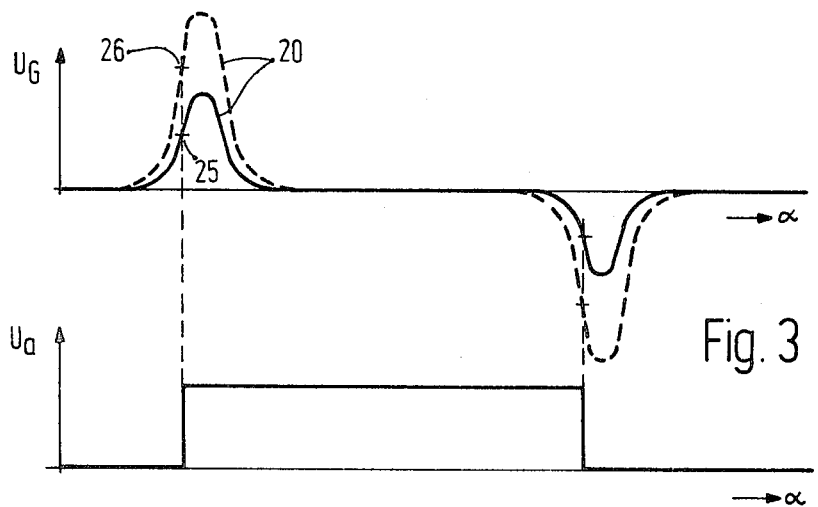

As shown in FIGS. 2 and 3, by means of the inductive transducer arrangement 1, an alternating voltage is generated in accordance with the rotary speed; this voltage is shown in FIG. 2 plotted in accordance with time and in FIG. 3 in accordance with the rotary angle. The transducer voltage is carried via the low-pass filter 2, in order to eliminate the high-frequency peaks. The first capacitor 7 charges via the first diode 3 to approximately the negative peak value of the transducer voltage and then discharges, with the first discharge resistor 8 and the third resistor 9 determining the discharge speed. The discharging process is represented in FIG. 2 by the curve 21. The transducer voltage is carried further via the first resistor 5 to the junction A, at which the transducer voltage 20, at twice the value, and the discharge voltage 21 are superimposed. This is shown in FIG. 2 by the curve 22, which represents a shift of the transducer voltage to negative values. The third diode 10 is connected in such a manner that only positive voltages are allowed to pass through. This range is indicated in FIG. 2 by shading. The threshold value of the Schmitt trigger 11 is preset in such a manner that the Schmitt trigger switches at the instant when the curve 22 crosses from negative voltages through zero.

The same applies to the negative half of the wave of the transducer voltage 20. Via the second diode 4, the second capacitor 12 is charged positively up to approximately the peak value of the transducer voltage. At the junction B, the voltages are superimposed on one another, and the result is the curve marked 23 in FIG. 2. The fourth diode 15 allows only negative voltages to pass through, and the Schmitt trigger 11 switches whenever the voltage 23 crosses through zero from positive values. Via the protective diodes 16–19, a portion of the current is drawn off outside the switching range of the Schmitt trigger 11.

Normally, the amplitude of the transducer voltage increases in accordance with the rotary speed. This higher transducer voltage is indicated by dashed lines in upper part of FIG. 3. If the amplitude of the transducer voltage 20 is increased, the capacitors 7, 12 are also charged up to higher peak values; that is, the discharge voltages 21, 24 have higher absolute values. In the superimposition of the voltages at the junctions A, B, it is demonstrated that as a result of the shift of the discharge voltages 21, 24 to higher absolute values, the zero crossing of the voltages corresponding to the curves 22, 23 remains constant in accordance with the rotary angle. This is shown once again in FIG. 3. The lower part of FIG. 3 shows the output voltage of the Schmitt trigger 11 in accordance with the rotary angle. It can be seen that the switching point 25 on the dashed line shifts linearly up to the switching point 26 in accordance with the higher transducer voltage.

In the present exemplary embodiment, the negative discharge voltage 21 is utilized for shifting the positive wave half of the transducer voltage 20, thereupon already attaining sufficient precision. For still more precise systems, the positive discharge voltage can be utilized for shifting the switching point of the positive wave half of the transducer voltage 20 as well, for instance if an inverter is connected between the junction of the resistors 5 and 6 with the low-pass filter 2 and the junction of the diodes 3 and 4.

I claim:

1. An apparatus for generating a digital signal train representative of rotary speed from the periodic voltage of an inductive transducer arrangement, in particular for controlling ignition systems of an internal combustion engine, said signal generating apparatus having an inductive transducer arrangement (1), a voltage signal superposition stage (3–10, 12–19) connected to said transducer (1), and a threshold stage (11) connected to said superposition stage, wherein, in accordance with the invention and in order to reduce the inherent systematic error which can result from variation of the amplitude of transducer output voltage as a function of rotary speed, means are provided which shift the transducer voltage to a different absolute value in accordance with said output voltage amplitude, before it is delivered to the threshold stage (11), in such a manner that the switching point of the threshold stage (11) is invariant for a given rotary angle, regardless of the amplitude of said voltage.

2. An apparatus as defined by claim 1, characterized in that via a first diode (3, 4) a capacitor (7, 12) is charged by the transducer voltage, that the voltage located at the capacitor (7, 12) is superimposed with the transducer voltage and that prior to the threshold stage (11) a further diode (10, 15) is provided, which rectifies the superimposed voltage.

3. An apparatus as defined by claim 2, characterized in that the first diode (3, 4) and the further diode (10, 15) have opposite conducting directions.

4. An apparatus as defined by claim 1, characterized in that a first separate circuit path (4,12,15) is provided for the negative half-oscillation of the transducer voltage and a second separate circuit path (3,7,10) is provided for the positive half-oscillation of the transducer voltage, each circuit path having a first diode (3,4), one capacitor (7, 12) and one further diode (10,15).

5. An apparatus as defined in claim 4, further comprising a resistor (5,6) connected in parallel with the first diode (3,4) of each of said circuit paths.

6. An apparatus as defined by claim 2, characterized in that a first separate circuit path (4,12,15) is provided for the negative half-oscillation of the transducer voltage and a second separate circuit path (3,7,10) is provided for the positive half-oscillation of the transducer voltage, each circuit path having a first diode (3,4), one capacitor (7, 12) and one further diode (10,15).

7. An apparatus as defined in claim 6, further comprising a resistor (5,6) connected in parallel with the first diode (3,4) of each of said circuit paths.

8. An apparatus as defined in claim 3, characterized in that a first separate circuit path (4,12,15) is provided for the negative half-oscillation of the transducer voltage and a second separate circuit path (3,7,10) is provided for the positive half-oscillation of the transducer voltage, each circuit path having a first diode (3,4), one capacitor (7, 12) and one further diode (10,15).

9. An apparatus as defined in claim 8, further comprising a resistor (5,6) connected in parallel with the first diode (3,4) of each of said circuit paths.

10. An apparatus as defined in claim 1, wherein said threshold stage (11) is a Schmitt trigger and is preset to switch when the output voltage of said superposition stage crosses though zero.

11. An apparatus as defined in claim 10, furthercomprising protective means (16–19) for drawing off current outside the switching range of said Schmitt trigger (11).

12. An apparatus as defined in claim 2, wherein two of said further diodes (10,15) are provided, and the anode of one (4) of said diodes and the cathode of the other (3) of said diodes are both connected to an input of said threshold stage (11).

13. An apparatus as defined in claim 1, further comprising a low-pass filter (2) connected between said transducer (1) and said superposition stage (3–10,-12–19).

14. An apparatus as defined in claim 2, further comprising a low-pass filter (2) connected between said transducer (1) and said superposition stage (3–10,-12–19).

15. An apparatus as defined in claim 3, further comprising a low-pass filter (2) connected between said transducer (1) and said superposition stage (3–10,-12–19).

16. An apparatus as defined in claim 4, further comprising a low-pass filter (2) connected between said transducer (1) and said superposition stage (3–10,-12–19).

17. An apparatus for generating a digital signal train representative of rotary speed from the periodic output voltage of an inductive transducer arrangement, in particular for controlling ignition systems of an internal combustion engine, said signal generating apparatus having an inductive transducer arrangement (1), a low-pass filter (2) connected to said transducer (1), a voltage signal superposition stage (3–10, 12–19) connected to said low-pass filter (2), and a Schmitt trigger threshold stage (11) connected to said superposition stage, wherein, in accordance with the invention and in order to reduce the inherent systematic error which can result from variation of the amplitude of transducer output voltage as a function of rotary speed, means (3–10,12–19) are provided which shift the transducer voltage to a different absolute value in accordance with said output voltage amplitude, before it is delivered to the threshold stage (11), in such a manner that the switching point of the threshold stage (11) is invariant for a given rotary angle, regardless of the amplitude of said voltage, said shifting means comprising a first separate circuit path (4,12,15) for processing the negative half-oscillation of the transducer voltage, and a second separate circuit path (3,7,10) for processing the positive half-oscillation of the transducer voltage, each circuit path having a first diode (3,4), one capacitor (7, 12) and one further diode (10,15) connected to the input of said Schmitt trigger stage (11).

18. An apparatus as defined in claim 17, further comprising a resistor (5,6) connected in parallel with the first diode (3,4) of each of said circuit paths.

* * * * *